United States Patent
Bilobrov et al.

(10) Patent No.: US 7,280,689 B2
(45) Date of Patent: Oct. 9, 2007

(54) ANTI-COMPRESSION TECHNIQUES FOR VISUAL IMAGES

(75) Inventors: Sergiy Bilobrov, Coquitlam (CA); Albert Chau, Burnaby (CA); Ronald H. Gerhards, Vancouver (CA); Jason Lesperance, Vancouver (CA); Hongfei Ma, Vancouver (CA); David Jacques Vaisey, Belcarra (CA); Richard J. Beaton, Burnaby (CA)

(73) Assignee: QDesign U.S.A., Inc., Seattle, WA (US)

(*) Notice: Subject to any disclaimer, the term of this patent is extended or adjusted under 35 U.S.C. 154(b) by 738 days.

(21) Appl. No.: 10/190,286

(22) Filed: Jul. 5, 2002

(65) Prior Publication Data

US 2004/0005077 A1     Jan. 8, 2004

(51) Int. Cl.
*G06K 9/00* (2006.01)

(52) U.S. Cl. .............. 382/166; 382/232; 375/240.24; 375/240.27

(58) Field of Classification Search ............... 382/166, 382/118, 236, 239; 348/699, 14.01, 14.12, 348/14.13; 375/240.01, 240.03, 240.04, 375/240.15, 240.27, 240.16, 240.21
See application file for complete search history.

(56) References Cited

U.S. PATENT DOCUMENTS

| | | | |
|---|---|---|---|
| 6,064,764 A * | 5/2000 | Bhaskaran et al. ......... | 382/183 |
| 6,111,844 A | 8/2000 | Lacy et al. | |
| 6,219,453 B1 * | 4/2001 | Goldberg .................... | 382/229 |
| 6,222,932 B1 * | 4/2001 | Rao et al. ................... | 382/100 |
| 6,298,166 B1 * | 10/2001 | Ratnakar et al. ........... | 382/248 |
| 6,385,329 B1 * | 5/2002 | Sharma et al. .............. | 382/100 |
| 6,463,162 B1 * | 10/2002 | Vora .......................... | 382/100 |
| 6,590,996 B1 * | 7/2003 | Reed et al. ................. | 382/100 |
| 6,643,383 B1 * | 11/2003 | Dugelay .................... | 382/100 |
| 6,683,966 B1 * | 1/2004 | Tian et al. .................. | 382/100 |

FOREIGN PATENT DOCUMENTS

| | | |
|---|---|---|
| EP | 0831 596 A2 | 3/1998 |
| EP | 0 889 470 A2 | 1/1999 |
| EP | 0947 953 A2 | 10/1999 |
| JP | 2000-182320 | 6/2000 |
| WO | WO 01/88915 A1 | 11/2001 |

* cited by examiner

Primary Examiner—Sheela Chawan
(74) Attorney, Agent, or Firm—Davis Wright Tremaine LLP

(57) ABSTRACT

In order to discourage compression of video and other visual image signal data that accompanies unauthorized reproduction, distribution and storage of such data, the signal data is modified in a manner to be essentially imperceptible but which, when compressed and then decompressed, causes the signal quality to be unacceptable. In one approach, the visual signal is modified directly. In another approach, the signal is first transformed into the same domain where a compression-decompression algorithm encodes and decodes the data, and then the transformed signal is modified so that the quality of the visual signal when decompressed and displayed is unacceptably degraded.

22 Claims, 10 Drawing Sheets

Figure 1. Just Noticeable Difference: Interframe Luminance.

ANTI-COMPRESSION TECHNIQUES FOR VISUAL IMAGES

CROSS REFERENCE TO RELATED APPLICATIONS

This application is related to U.S. patent application Ser. No. 09/854,166, filed May 11, 2001 (also published under the Patent Cooperation Treaty as no. WO 01/88915 on Nov. 22, 2001), which is a continuation-in-part of application Ser. No. 09/667,345, filed Sep. 22, 2000, and which is a continuation-in-part of application Ser. No. 09/570,655, filed May 15, 2000. This is also related to U.S. patent application Ser. No. 09/584,134, filed May 31, 2000 (also published under the Patent Cooperation Treaty as no. WO 01/93000 on Dec. 6, 2001), which is a continuation-in part of Ser. No. 09/484,851, filed Jan. 18, 2000, and which is a continuation-in-part of application Ser. No. 09/356,104, filed Jul. 16, 1999. The foregoing patent applications and publications are hereby incorporated herein in their entirety by this reference.

FIELD OF THE INVENTION

This invention is related to the processing, transmission and recording of electronic signals of visual information data, particularly successive video frames, intended for viewing by humans, and, more specifically, to techniques that prevent or discourage the unauthorized copying, transmission or recording of such signals.

BACKGROUND

The development of low bit-rate encoding techniques for reducing the storage and transmission requirements for digital audio and video coupled with the availability of consumer broadband Internet connections has made it possible and cost-effective to transmit large amounts of media over the Internet. This same technology makes it possible for consumers to record and share video content over the Internet.

There are many encoding technologies used for storing, transmitting, and distributing digital video. The international standards developed by the Moving Pictures Expert Group (MPEG-1, MPEG-2, and MPEG-4) have achieved widespread adoption.

The first MPEG digital video and audio encoding standard, ISO/IEC 11172 (MPEG-1), was adopted as an international standard in 1992. The MPEG-1 standard provides VHS-quality digital video and audio at a bit rate of approximately 1.5 Mbps for CD-ROM playback. MPEG-1 video compression exploits the information redundancy within individual video frames as well as that between video frames to compress a video sequence.

Video frames are encoded using the YCbCr luminance (brightness) and chrominance (color difference) representation. This luminance/chrominance representation is used because the human eye distinguishes differences in brightness more readily than differences in color. As a result, the Cb and Cr chrominance components can be encoded at a lower resolution than the Y luminance components without significantly impacting the video quality. The YCbCr data is processed using the Discrete Cosine Transform (DCT) to compact the signal energy prior to quantization. MPEG-1 video encoding utilizes three frame types: Intra-coded Frames, forward-Predicted frames and Backward-predicted frames. Intra-coded frames, or I-frames, are self-contained and do not require information from previous or future frames to be decoded. Forward-predicted frames or P-frames are encoded as predictions relative to a previous I-frame or P-frame. Backward-predicted frames or B-frames are encoded as predictions relative to either a previous or future I-frame or P-frame, or both.

International Standard ISO/IEC 13818 (MPEG-2) was published as a standard in 1994 and provides higher quality and higher bitrate video encoding than MPEG-1. MPEG-2, which is backwards compatible with MPEG-1, was designed to be very scalable and flexible, supporting bitrates ranging from approximately 2 Mbps to more than 20 Mbps and video resolutions ranging from 352×240 pixels to 1920×1080 pixels. In addition, MPEG-2 added support for encoding interlaced video.

ISO/IEC International Standard 14496 (MPEG-4), is the most recent MPEG encoding standard and was ratified in 1999. MPEG-4 is a scalable standard supporting data rates from less than 64 Kbps for Internet streaming video to about 4 Mbps for higher-bandwidth applications. MPEG-4 differs from MPEG-2 and MPEG-1 in that it includes object recognition and encoding, as well as synchronized text and metadata tracks. MPEG-4 supports both progressive and interlaced video encoding and is object-based, coding multiple video object planes into images of arbitrary shape.

The popular DivX encoder commonly used for sharing of video files over the Internet is based on MPEG-4.

Models of Visual Perception

All video encoders rely on properties of the human visual system. This section discusses the visual perceptual model as it relates to video coding. Distortion sensitivity profiles for human perception are specified as functions of frequency, luminance, texture, and temporal parameters.

Frequency Sensitivity

The human visual system exhibits different levels of sensitivity to visual information at different frequencies. This characteristic is known as the Contrast Sensitivity Function (CSF), and is generally accepted to have a band-pass frequency shape. Video encoders can use the CSF response to guide the allocation of coding bits to shape the resulting distortion so that it is less visible.

Luminance Sensitivity

The human visual system's ability to detect objects against a background varies depending to the background luminance level. In general, the human visual system is most sensitive with a medium luminance background and least sensitive with either very dark or very bright backgrounds.

Texture Sensitivity

The human visual system is less able to detect objects in areas where an image exhibits significant variations in the background luminance. This effect is known as texture masking and can be exploited by a video codec to improve coding efficiency.

Temporal Sensitivity

The human visual system is less able to detect details in objects that are moving within a video sequence. This effect is known as temporal masking and can be exploited by a video codec to improve coding efficiency.

Just-Noticeable-Distortion (JND)

The just-noticeable distortion (JND) profile is the visibility threshold of distortion, below which distortions are imperceptible. The JND profile of an image depends on the image contents. All of the characteristics of the human visual system described earlier—frequency, luminance, texture and temporal sensitivity—should be taken into consideration in deriving the JND profile. FIG. 1 shows JND plotted as a function of inter-frame luminance difference.

Video Coding Technologies

The following sections present some of the common techniques which exploit the human visual properties and which form the basis of current video coding technologies.

The basic processing blocks of an exemplary video encoder applied on an intra-frame basis are: the video filter, discrete cosine transform, coefficient quantizer, and run-length coding/variable length coding. FIG. 2 shows an example of the process for intra-frame video coding.

Color Space Sub-sampling

Video encoders operate on a color space that takes advantage of the eye's different sensitivity to luminance and chrominance information. As such, video encoders use the YCbCr or YUV color space to allow the luminance and chrominance to be encoded at different resolutions. Typically the chrominance information is encoded at one-quarter or one-half the resolution of the luminance information. The chrominance signals need to be filtered to generate this format. The actual filtering technique is left to the system designer as one of several parameters that may be optimized on a cost versus performance basis.

DCT Coefficients

Video encoders use an invertible transform to reduce the correlation between neighboring pixels within an image. The Discrete Cosine Transform (DCT) has been shown to be near optimal for a large class of images in terms of energy concentration and de-correlation. The DCT transforms a spatial 8×8 pixel block into a block of 8×8 DCT coefficients. Each coefficient represents a weighting value for each of the 64 orthogonal basis patterns shown in FIG. 3. The DCT coefficients toward the upper left-hand corner of the coefficient matrix correspond to smoother spatial contours, while the DCT coefficients toward the lower right-hand corner of the coefficient matrix correspond to finer spatial patterns.

Variable-Length Coding

Video codecs take advantage of the human visual system's lower sensitivity to high frequency distortions by more coarsely quantizing or even omitting the high frequency DCT coefficients. When there are numerous zero-valued DCT coefficients, considerable coding efficiency can be achieved by representing these zero coefficients using a run-length coding scheme. But before that process is performed, more efficiency can be gained by reordering the DCT coefficients in a zigzag-scanning pattern as shown in FIG. 4.

Predictive Coding

Intra-frame (or I frame) coding techniques are limited to processing the current video frame on a spatial basis. Considerably more compression efficiency can be obtained with inter-frame coding techniques which exploit the temporal or time-based redundancies. Inter-frame coding uses a technique known as block-based motion compensated prediction using motion estimation. Inter-frame coding techniques are used within P-frames or B-frames.

Forward-predicted frames or P-frames are predicted from a previous I or P-frame. Bi-directional interpolated prediction frames or B-frames are predicted and interpolated from a previous I or P-frame and/or a succeeding I or P-frame.

As an example of the usage of I, P, and B frames, consider a group of pictures that lasts for 6 frames, and is given as I,B,P,B,P,B,I,B,P,B,P,B, . . . The I frames are coded spatially and the P frames are forward predicted based on previous I and P frames. B frames are coded based on forward prediction from a previous I or P frame, as well as backward prediction from a succeeding I or P frame. As such, the example sequence is processed by the encoder such that the first B frame is predicted from the first I frame and first P frame, the second B frame is predicted from the first and second P frames, and the third B frame is predicted from the second P frame and the first I frame of the next group of pictures. Most broadcast quality applications have tended to use two consecutive B frames as the ideal trade-off between compression efficiency and video quality as shown in FIG. 5.

The main advantage of using B frames is coding efficiency. In most cases, B frames will result in lower bit consumption. Use of B frames can also improve quality in the case of moving objects that reveal hidden areas within a video sequence. Backward prediction in this case allows the encoder to make more intelligent decisions on how to encode the video within these areas. Since B frames are not used to predict future frames, errors generated will not be propagated further within the sequence.

Motion Estimation and Compensation

The temporal prediction used in video encoders is based on motion estimation. The basic premise of motion estimation is that in most cases, consecutive video frames will be similar except for changes induced by objects moving within the frames. In the trivial case of zero motion between frames (and no other differences caused by noise), it is easy for the encoder to efficiently predict the current frame as a duplicate of the prediction frame. When this is done, the only information necessary to transmit to the decoder becomes the syntactic overhead necessary to reconstruct the picture from the original reference frame. When there is motion between frames, the situation is not as simple. The problem is to adequately represent the changes, or differences, between two video frames.

Motion estimation solves this problem by performing a comprehensive 2-dimensional spatial search for each luminance macroblock. Motion estimation is not calculated using chrominance, as it is assumed that the color motion can be adequately represented with the same motion information as the luminance. It should also be noted that video encoding standards do not define how this search should be performed. This is a detail that the system designer can choose to implement in one of many possible ways. It is well known that a full, exhaustive search over a wide 2-dimensional area yields the best matching results in most cases, but this performance comes at a high computational cost. As motion estimation is usually the most computationally expensive portion of the video encoder, some lower cost encoders choose to limit the pixel search range, or use other techniques such as telescopic searches, usually at some reduction in video quality.

Motion estimation operates by matching at the macroblock level. When a relatively good match has been found, the encoder assigns motion vectors to the macroblock that indicate how far horizontally and vertically the macroblock must be moved so that a match is made. As such, each forward and backward predicted macroblock contains two motion vectors and true bi-directionally predicted macroblocks utilize four motion vectors. FIG. 6 illustrates the calculation of motion vectors.

Macroblock Coding

After motion estimation is complete, the predicted frame is subtracted from the desired frame, leaving a less complicated residual error frame that can then be encoded much more efficiently. It can be seen that the more accurate the motion is estimated and matched, the more likely it will be that the residual error will approach zero, and the coding efficiency will be highest. Further coding efficiency is accomplished by taking advantage of the fact that motion vectors tend to be highly correlated between macroblocks. Because of this, the horizontal component is compared to the previously valid horizontal motion vector and only the difference is coded. This same difference is calculated for the vertical component before coding. These difference codes are then described with a variable length code for maximum compression efficiency. Of course not every macroblock search will result in an acceptable match. If the encoder decides that no acceptable match exists (again, the acceptable criteria is not video codec defined, and is up to the system designer) then it has the option of coding that particular macroblock as an intra macroblock, even though it may be in a P or B frame. In this manner, high quality video is maintained at a slight cost to coding efficiency. FIG. 7 illustrates an example of a general decision tree of macroblock coding models.

The macroblock may be encoded in any of the models, and each coding model consumes a different amount of the available bits. The macroblock coding model attack is designed to control the model decision resulting in the selection of a higher bit rate model.

Video Buffer and Rate Control

Most video encoders will encode video sequences to a specified bitrate. Meeting the desired bitrate is a rather complicated task as the encoder must deal with drastically different coding efficiencies for different regions within a video frame, different frames within a video sequence, and different coding methods for each video frame.

Because of these variations, it is necessary to buffer the encoded bit-stream before it is transmitted. Since the buffer must necessarily be limited in size (physical limitations and delay constraints), a feedback system must be used as a rate control mechanism to prevent underflow or overflow within the buffer.

SUMMARY OF THE INVENTION

Rather than further attempting to prevent copying, a visual signal, including that of a still image, a series of video image frames, or the like, is accessible by a user only in a form where its compression and decompression by an available algorithm causes the resultant signal to be significantly perceptually degraded. This is accomplished by adding noise or some other signal to the visual signal being transmitted or recorded that is not perceived by a human when viewing the visual content but which is perceived to be very annoying if the modified signal is compressed and then decompressed. Since digital visual data is usually transmitted over the Internet or other communications system in a compressed form, and a compressed form of visual data is also often recorded, the inability to compress a visual signal, because the resulting decompressed signal is unacceptable in quality to the viewer, significantly limits the benefit of unauthorized transmission or recording of the data.

In one implementation, the visual signal is modified by first transforming it from its initial domain into an intermediate domain where a compression and decompression (compression/decompression) algorithm operates to encode the signal. Domain transformations include those between time and frequency, between different color spaces, or both. Noise or some other signal is added to the visual signal in the intermediate domain and the modified visual signal is then inversely transformed back into the initial domain. The modification to the visual signal in the intermediate domain does not affect the perceived quality of the inverse transformed signal, so the user may enjoy the visual information for which he or she is authorized to view. But it does discourage a user from compressing the modified signal for unauthorized transmission or other use, since the resulting decompressed signal will have an inferior quality.

As a specific example this modification technique, a common video signal having discrete colour signals such as separate signals for red, green and blue (RGB), is transformed into a luminance-chrominance signal having separate luminance signals for luminance (Y) and colour difference (e.g. U and V, or Cr and Cb). A noise signal is added to one or more of these signals in a manner to bring about the results stated above. Specifically, high frequency noise may be added to the colour difference signals in order to cause aliasing in an image viewed from the modified RGB signal after it has been compressed and decompressed.

In one specific application, shown in FIG. 15, electronic circuits for modifying a visual signal in one of the ways summarized above are included in a DVD player, set-top box used with cable or satellite television distribution systems, or similar consumer devices. A visual signal is then outputted from the player or box that can be viewed without significant degradation being perceived but if compressed, a decompressed version of the signal will be perceived by the viewer to have an unacceptably poor quality. These electronic circuits are physically sealed to prevent the user from having access to the visual signal before it has been modified in this way. The visual signal input to these processing circuits is a high quality video signal that has been decompressed from data stored on a DVD optical disc, for example.

The present invention addresses the growing problem of video piracy by decreasing the video quality of the unauthorized video encoding such that the resulting compressed video content contains sufficient visual distortion to significantly reduce its entertainment value. Presently, no system exists to address the video piracy problem by attacking the compression or re-compression quality of video content. FIG. 14 illustrates the distribution of digital video via broadcast or physical media. The activities contained within the gray box are some of the activities for which video ACT provides a deterrent.

DESCRIPTION OF EXEMPLARY EMBODIMENTS

In the following detailed description of the invention, reference is made to the accompanying drawings, which form a part hereof, and in which is shown, by way of illustration, specific examples in which the invention may be practiced. It is to be understood that other embodiments may be utilized and structural changes may be made without departing from the scope of the present invention. While the present invention is described in terms of the media having video content, it is to be understood that the present invention is applicable to media having audio content, such as music and speech, and/or images, and/or video, and/or textual content, and that modifications can be made without departing from the scope of the present invention.

Typical unauthorized distribution of media signals such as film, video and music is enabled by signal compression, which causes a reduction of data required to represent these signals through signal compression. The compressed media signals are transmitted as files or streams over the Internet and decompressed only during playback by the receiving party. The present invention consists of 'Anti-Compression Technology' (ACT), which aims to reduce the quality of subsequent compressed and decompressed versions of the signal while maintaining high quality of the original content.

Figure 8:
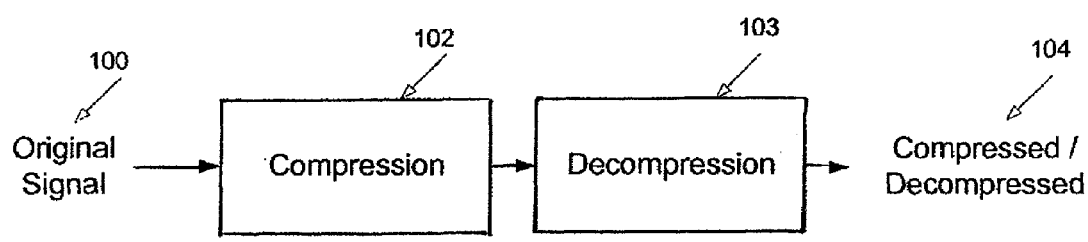
FIG. 8 is a block diagram illustrating the compression and decompression of an original signal to produce a compressed/decompressed version of the original signal.

FIG. 8 generally illustrates a typical compression/decompression process. An original visual information signal 100 is applied to a software compression encoder 102. The compressed signal is then typically recorded, transmitted over a communications network, or the like. At the time and place where it is desired to reconstruct the original signal, the compressed signal is applied to a software decompression decoder 103, resulting in a reconstruction 104 of the original signal 100. The reconstruction 104 is not mathematically the same as the original signal 100 but present high quality compression/decompression algorithms result in differences that are not readily perceptible to a human viewer.

Figure 9:
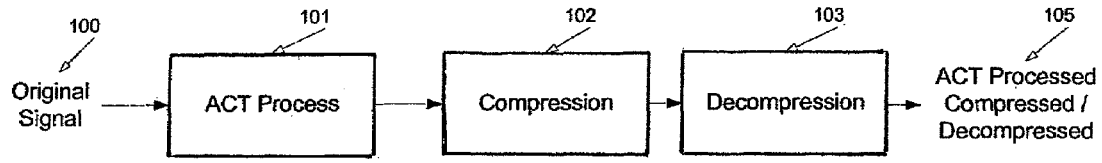
FIG. 9 illustrates the use of the present invention in the context of subsequent compression and decompression of the processed signal.

FIG. 9 shows the use of the present inventive process 101 to deter unauthorized distribution of media content by reducing the effectiveness of compression and decompression of the original signal 100. Typical unauthorized distribution employs the compression and decompression steps 102 and 103. In order to discourage this, as shown in FIG. 9, the present invention applies an ACT process 101 prior to the compression 102 and decompression 103 such that a resulting signal 105 after compression and decompression is degraded relative to the compressed and decompressed original signal 104 of FIG. 8.

Figure 10:
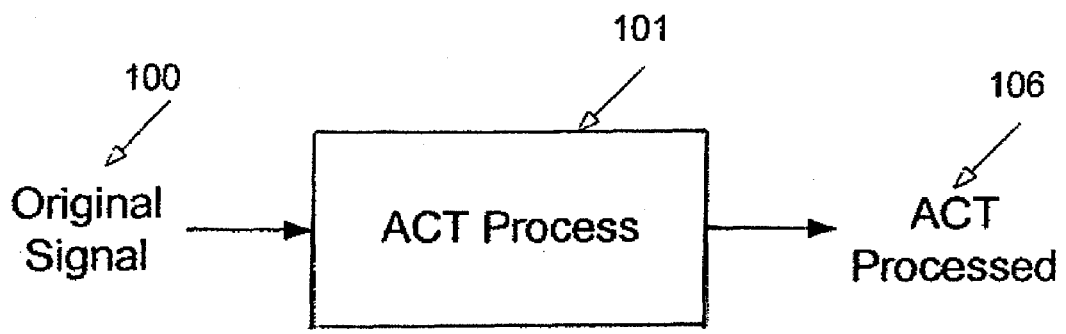
FIG. 10 illustrates the general use of the invention to process an original signal to produce an ACT processed signal.

FIG. 10 shows the application of the present invention to the original signal 100 to produce an ACT processed signal 106. It is intended that the ACT processed signal 106, prior to compression and decompression, is not significantly impaired with respect to the original signal 100. That is, the visual content of the signal 106 can be displayed without changes to the signal by the ACT processing 101 being perceived by the viewer. But if the signal 106 is then compressed by someone trying to record or transmit the compressed signal without permission, as shown in FIG. 9, the signal resulting from the subsequent decompression causes the visual display to have a sufficiently low quality that then discourages the unauthorized recording or transmission.

Figure 11:
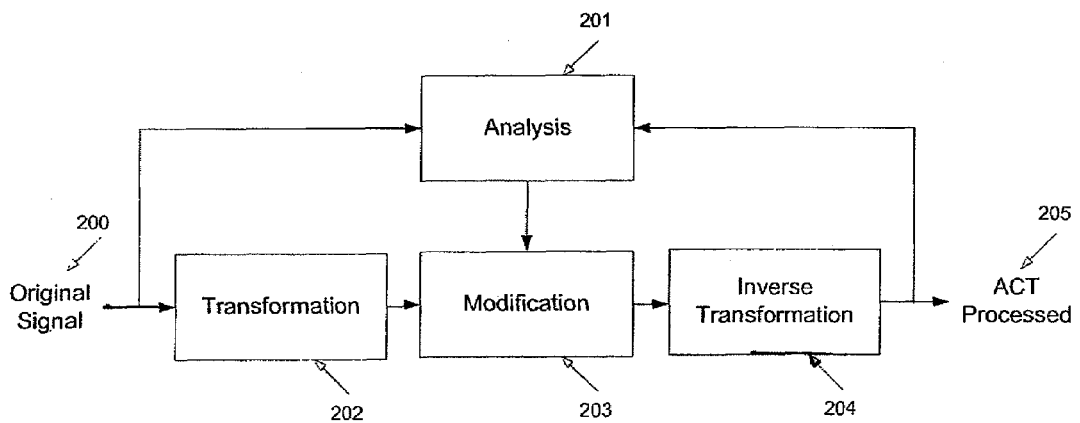
FIG. 11 is a block diagram illustrating an apparatus for carrying out the invention.

FIG. 11 presents a block diagram to generally show the ACT processing 101 of the present invention. An original signal 200 is passed through a transformation block 202 that converts it into a domain which matches an intermediate signal domain used by a "target" compression and decompression process which is contemplated to be used for any unauthorized storage or transmission. This domain may be in the spatial/temporal, frequency, color-space or other signal representation commonly used for processing, manipulating or compressing the original signal. The original signal 200 is also passed as input to an analysis step 201 whereby the signal is modeled and analyzed to determine the optimal anti-compression methods to employ. Models employed in the analysis step include psycho-visual and perceptual systems, rate distortion measures and just noticeable difference (JND) calculations. The analysis step produces parameters used by a modification step 203 in modifying the transformed original signal. The modified signal is then processed by an inverse transformation step 204 to produce the ACT processed signal 205 having the characteristics described above for the signal 106.

Figure 12:
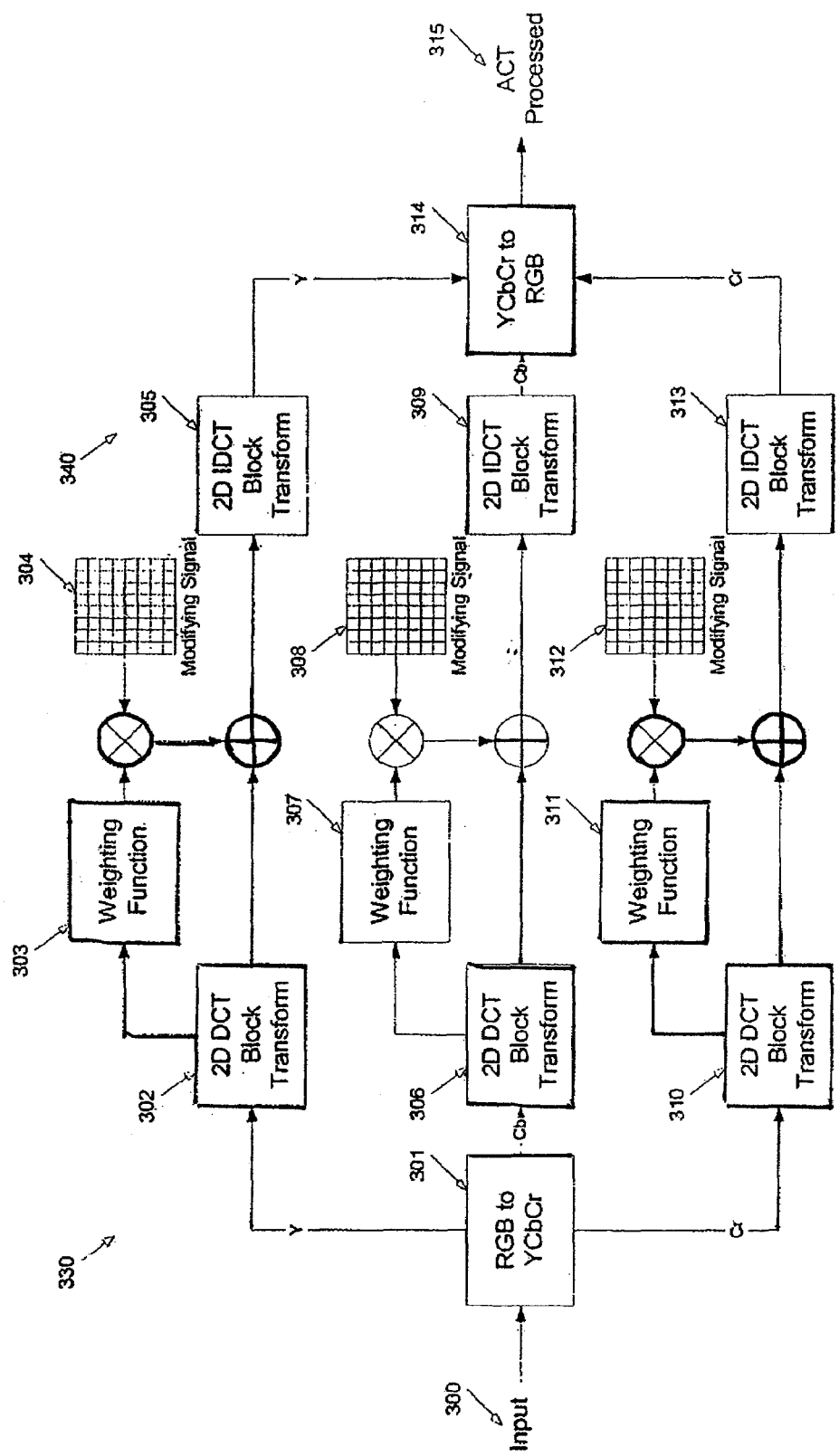
FIG. 12 is a block diagram illustrating a system for the processing of an original signal in accordance with the present invention.
Figure 13:
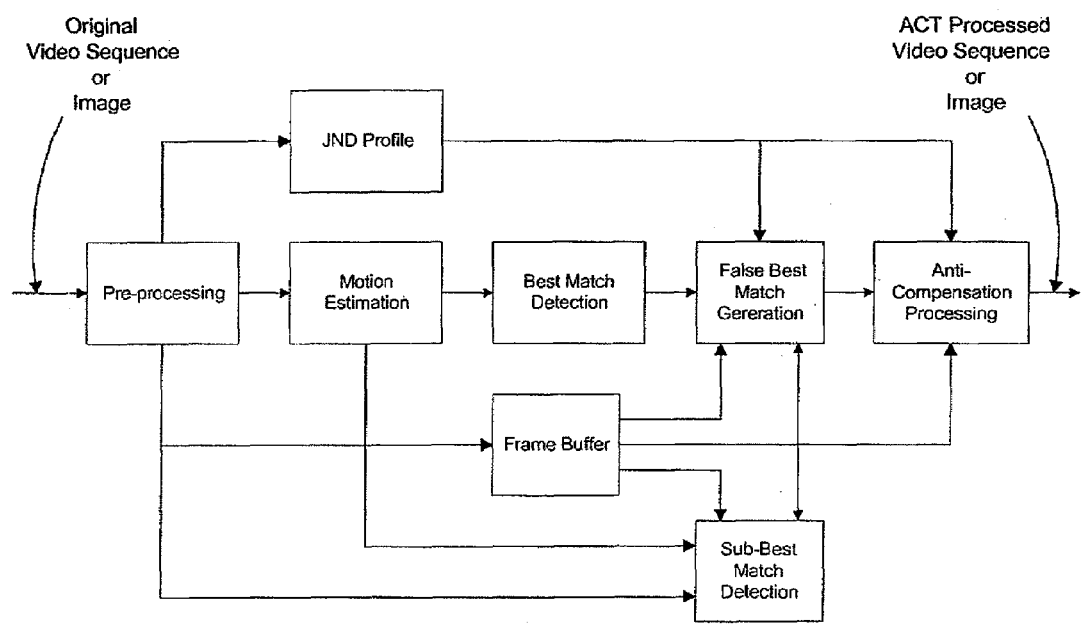
FIG. 13 is a block diagram illustrating a video or image anti-compression system based on motion estimation and compensation.
Figure 14:
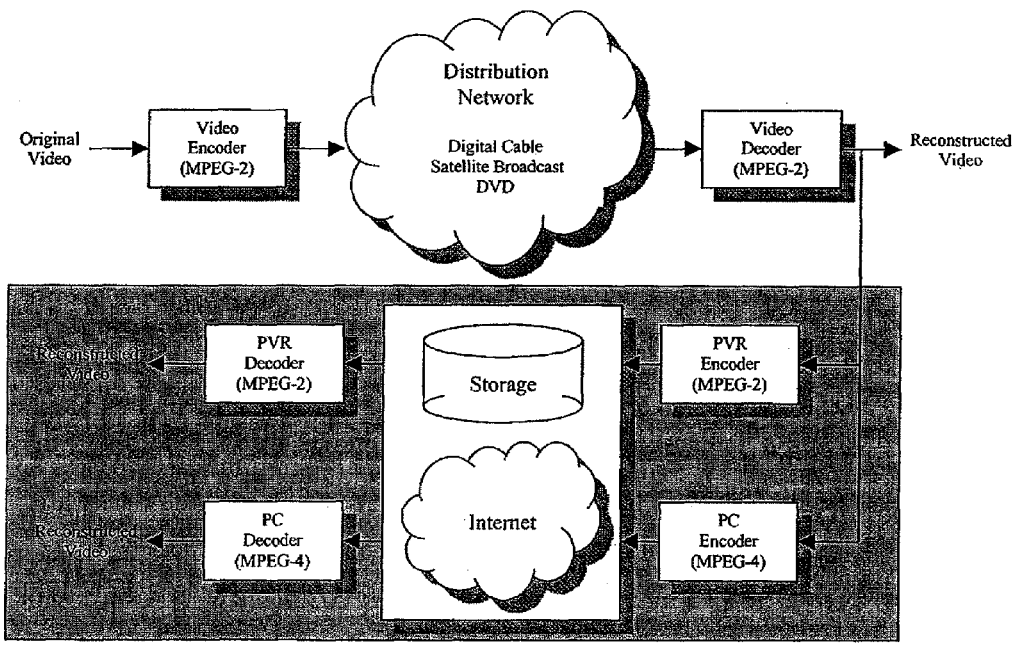
FIG. 14 is a block diagram illustrating the distribution of video via broadcast or physical media.
Figure 15:
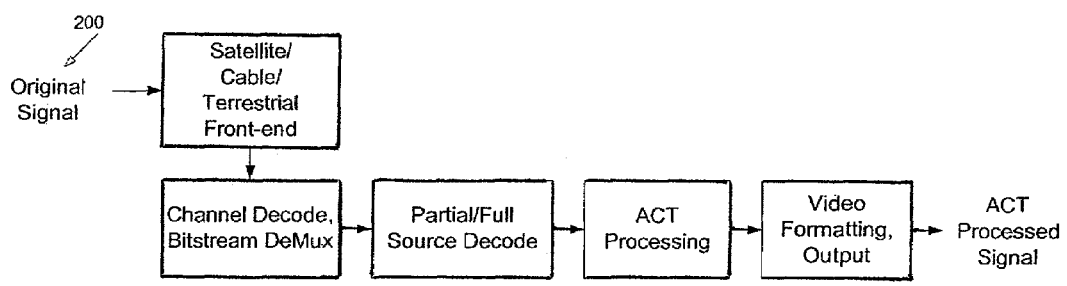
FIG. 15 is a block diagram illustrating the use of the present invention in a video set-top box application.

FIG. 12 illustrates one specific method for modifying the signal in accordance with the present invention described with respect to FIG. 11. In general, first, a colour space transformation is performed (Box 301) to transform the input image/video data (Signal 300 in a discrete color format such as RGB) into the desired colour space representation. Typically, the signal modification is most effectively performed in the same colour space in which the targeted codec (compression/decompression algorithm) will perform its compression coding. For MPEG-based codecs, this colour space is the YCrCb, or luminance/chrominance colour space. The output of the colour space transformation consists of 3 colour components, Y, Cr, and Cb, each of which is processed independently through very similar processes.

A frequency-domain transformation (Boxes 302, 306, 310) is applied to each of these colour space components. This frequency-domain transformation is performed to facilitate the insertion of the modification signal or to facilitate the analysis in determining a suitable modification signal.

The frequency-domain data is analyzed to produce a weighting function (Boxes 303, 307, 311), which is used to scale the modification signal (Boxes 304, 308, 312). The scaled modification signal is added to each of the colour-space components of the image/video signal to obtain the modified signal. The inverse frequency-domain transform (Boxes 305, 309, 313) is applied to the modified signal components to return the data to the original time/frequency space. Finally, the inverse colour space transformation (Box 314) is applied to transform the modified signal components back to the same colour-space representation as the input signal, typically a discrete color space, and to arrive at the ACT processed signal (Signal 315).

An exemplary colour space transformation is the RGB to YCrCb transformation given by:

$Y=(0.257*R)+(0.504*G)+(0.098*B)+16$ $Cb=-(0.148*R)-(0.291*G)+(0.439*B)+128$ $Cr=(0.439*R)-(0.368*G)-(0.071*B)+128$ and its complementary YCrCb to RGB transformation given by:

$R=1.164(Y-16)+1.596(Cb-128)$ $G=1.164(Y-16)-0.391(Cr-128)-0.813(Cb-128)$ $B=1.164(Y-16)+2.018(Cr-128)$

An exemplary frequency-domain transformation is the 2-D DCT given by:

$$B_{pq} = \alpha_p \alpha_q \sum_{m=0}^{M-1} \sum_{n=0}^{N-1} A_{mn} \cos\frac{\pi(2m+1)p}{2M} \cos\frac{\pi(2n+1)q}{2N}, \quad \begin{array}{l} 0 \le p \le M-1 \\ 0 \le q \le N-1 \end{array}$$

$$\alpha_p = \begin{cases} \frac{1}{\sqrt{M}} & p=0 \\ \sqrt{\frac{2}{M}} & 1 \le p \le M-1 \end{cases} \quad \alpha_q = \begin{cases} \frac{1}{\sqrt{N}} & q=0 \\ \sqrt{\frac{2}{N}} & 1 \le q \le N-1 \end{cases}$$

and its complementary 2-D Inverse DCT given by:

$$A_{mn} = \alpha_p \alpha_q \sum_{p=0}^{M-1} \sum_{q=0}^{N-1} B_{pq} \cos\frac{\pi(2m+1)p}{2M} \cos\frac{\pi(2n+1)q}{2N},$$

$0 \le m \le M-1$
$0 \le n \le N-1$ $$\alpha_p = \begin{cases} \frac{1}{\sqrt{M}} & p=0 \\ \sqrt{\frac{2}{M}} & 1 \le p \le M-1 \end{cases} \quad \alpha_q = \begin{cases} \frac{1}{\sqrt{N}} & q=0 \\ \sqrt{\frac{2}{N}} & 1 \le q \le N-1 \end{cases}$$

An exemplary weighting function is given by taking a portion of the DC component of each 8×8 pixel block. For the i'th vertical and j'th horizontal block:

$W[i,j]=c*B[i,j]_{0,0}$ where:

$B[i,j]_{0,0}$ is the DC bin (bin [0,0]) of the DCT of the [i,j]'th 8×8 pixel block.

An exemplary modification signal is an 8×8 checkerboard pattern (alternating pixels of minimum and maximum intensity). In the spatial domain with a minimum intensity of 0 and maximum intensity of 255, this signal is given by the matrix:

$$D = \begin{bmatrix} 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \end{bmatrix}$$

In a variant of the previous embodiment, the coefficients of the matrices W and D vary as functions of time $W[i,j,t]=F1(t)$ and $D[i,j,t]=F2(t)$ with the operations of the time-varying functions determined through analysis of the input signal and perceptual parameters. One example of a perceptual-based function, which may be combined with other parameters, is the Just Noticeable Difference profile, or JND. This model depends on the characteristics of the input signal, the viewing environment, ambient light, and viewing distance. An example of the generation of a spatial-temporal JND profile consists of the following steps:

Step 1:

The perceptual redundancy inherent in the spatial domain is quantitatively measured as a 2D profile by a perceptual model that incorporates the visibility thresholds due to average background luminance and texture masking. It is described by the following expression, $JND_S(x, y)=\max\{f_1(bg(x, y), mg(x, y)), f_2(bg(x, y))\}$,
for $0 \le x < W$, $0 \le y < H$ Where $f_1$ represents the error visibility threshold due to texture masking, $f_2$ the visibility threshold due to average background luminance; H and W denote respectively the height and width of the image; mg(x, y) denotes the maximal weighted average of luminance gradients around the pixel at (x, y); bg(x, y) is the average background luminance.

Figure 1:
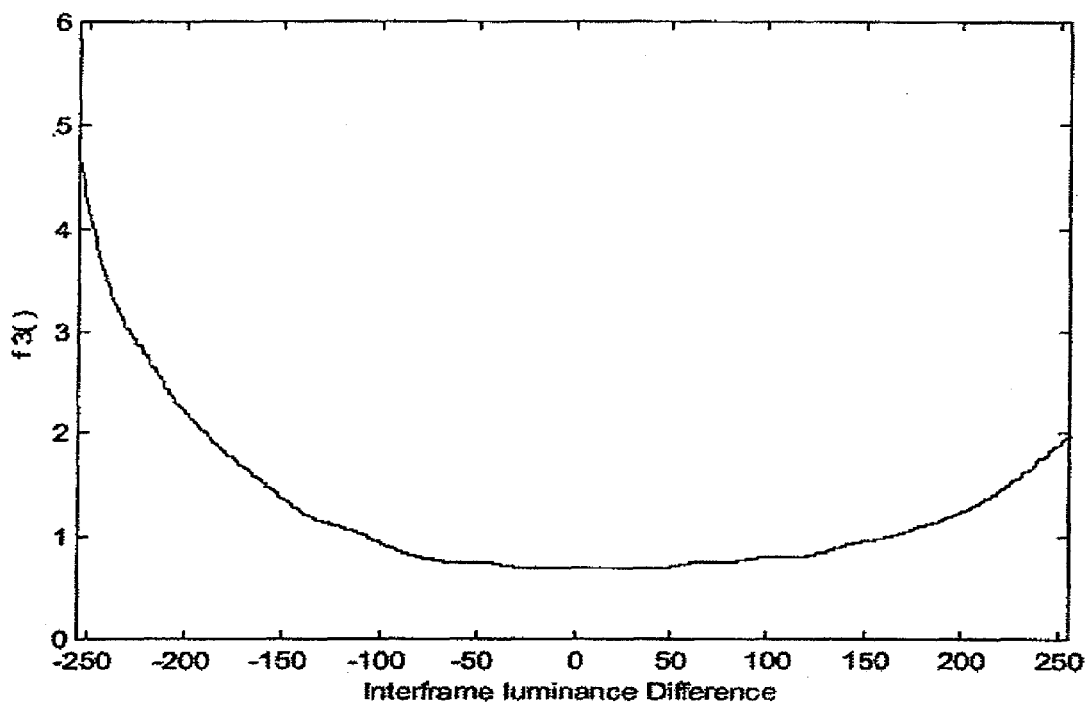
FIG. 1 illustrates the just noticeable difference plotted vs. inter-frame luminance differences.
Figure 2:
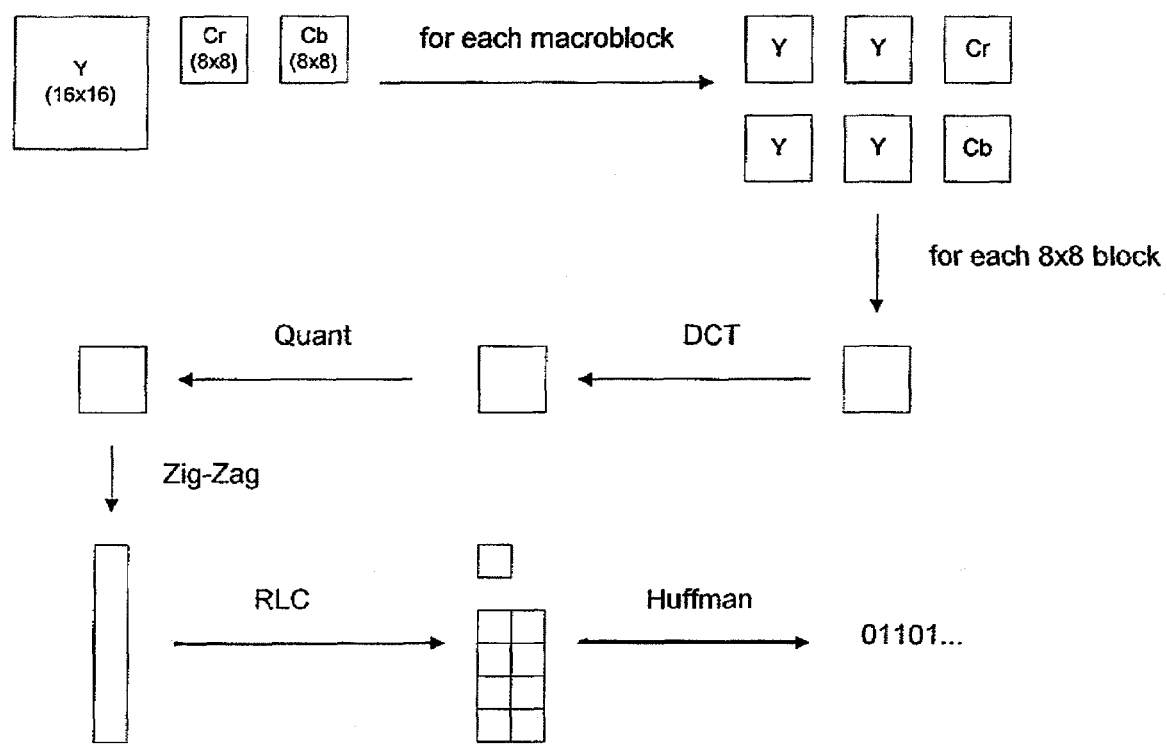
FIG. 2 shows the basic processing blocks of an example video encoder for intra-frame video coding.
Figure 3:
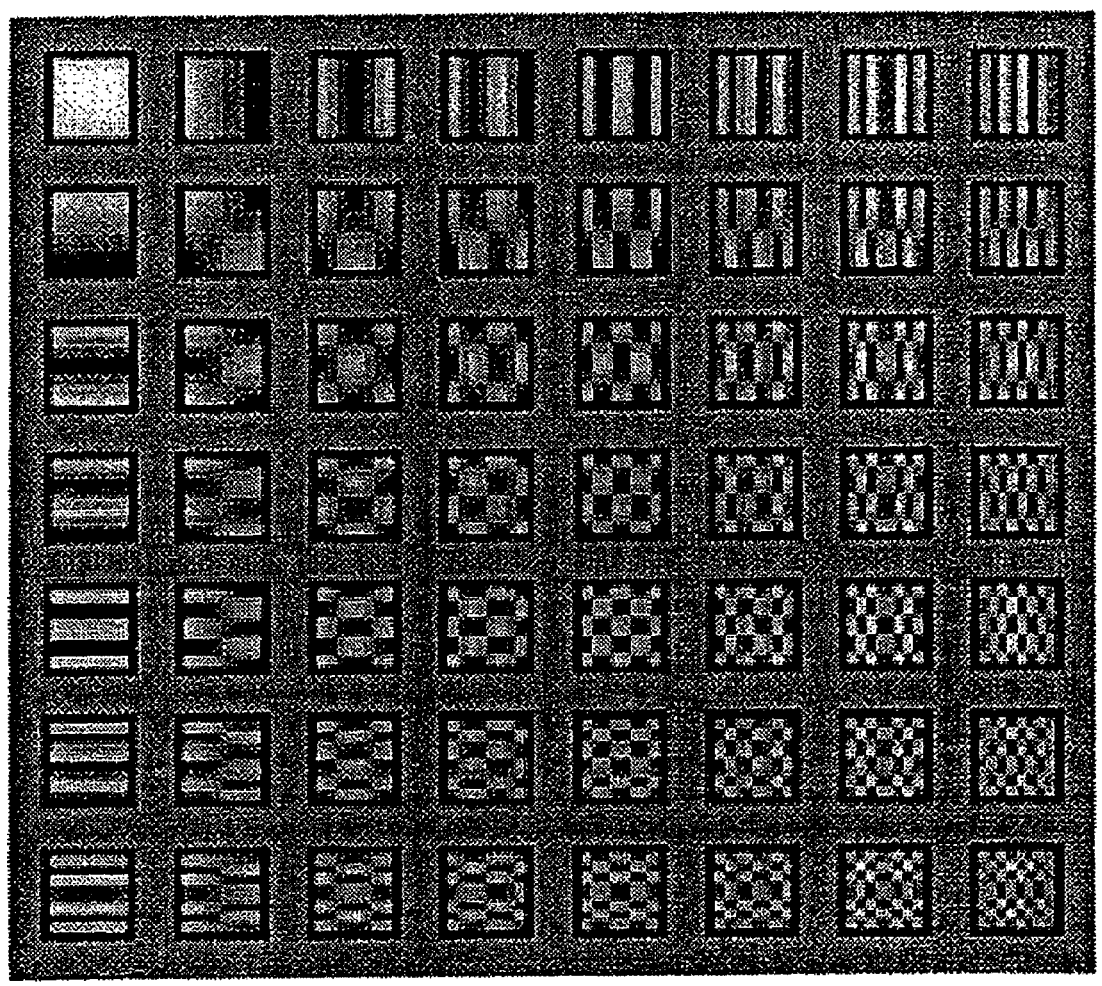
FIG. 3 shows the basis functions of a typical 2D Discrete Cosine Transform.
Figure 4:
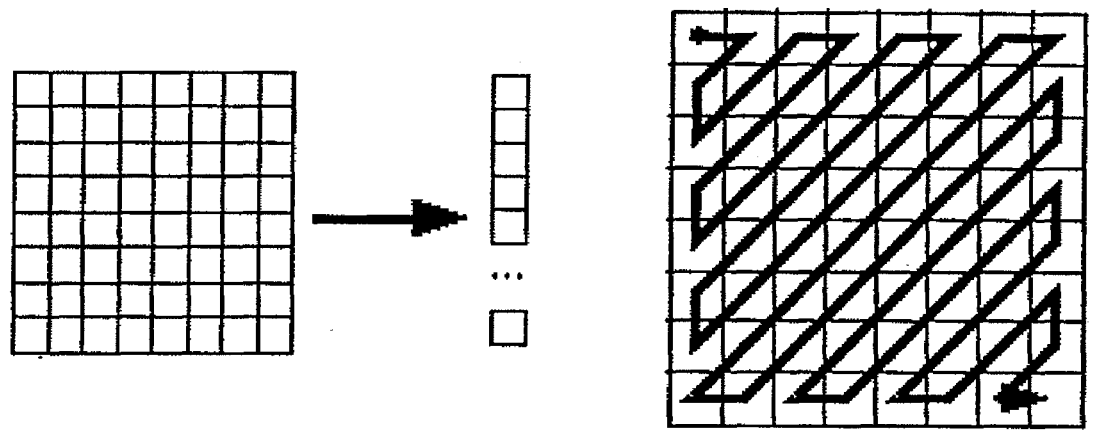
FIG. 4 illustrates the zigzag scanning pattern intended to maximize the probability of achieving long runs of consecutive zero coefficients.
Figure 5:
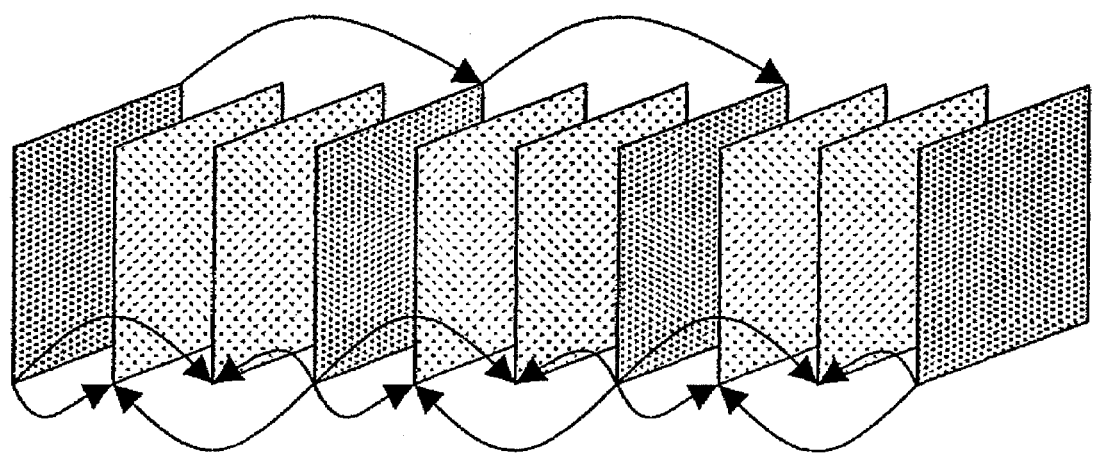
FIG. 5 illustrates an example sequence of I-Frames, P-Frames, and B-frames within an encoded video signal.
Figure 6:
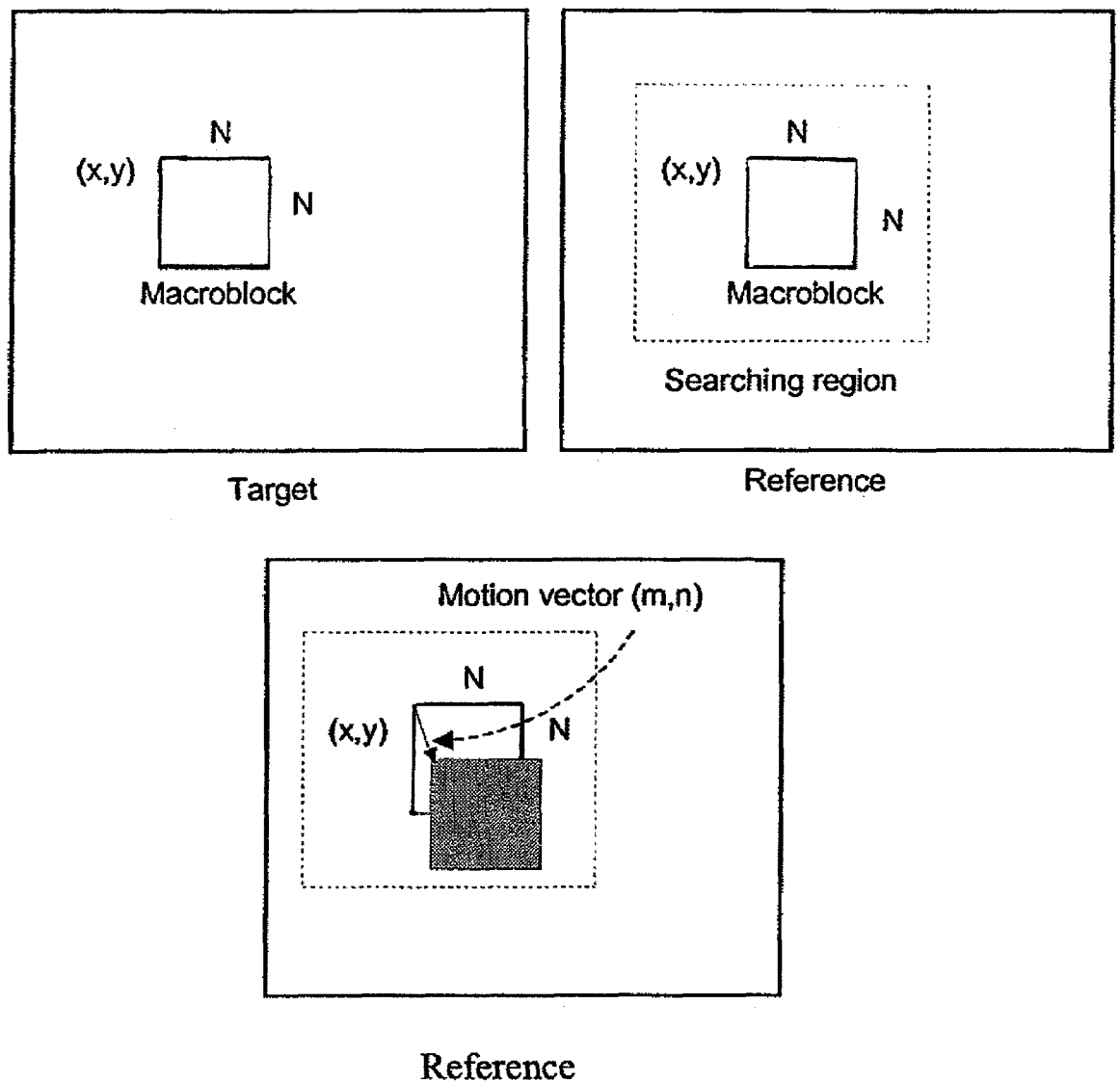
FIG. 6 illustrates the calculation of motion vectors.
Figure 7:
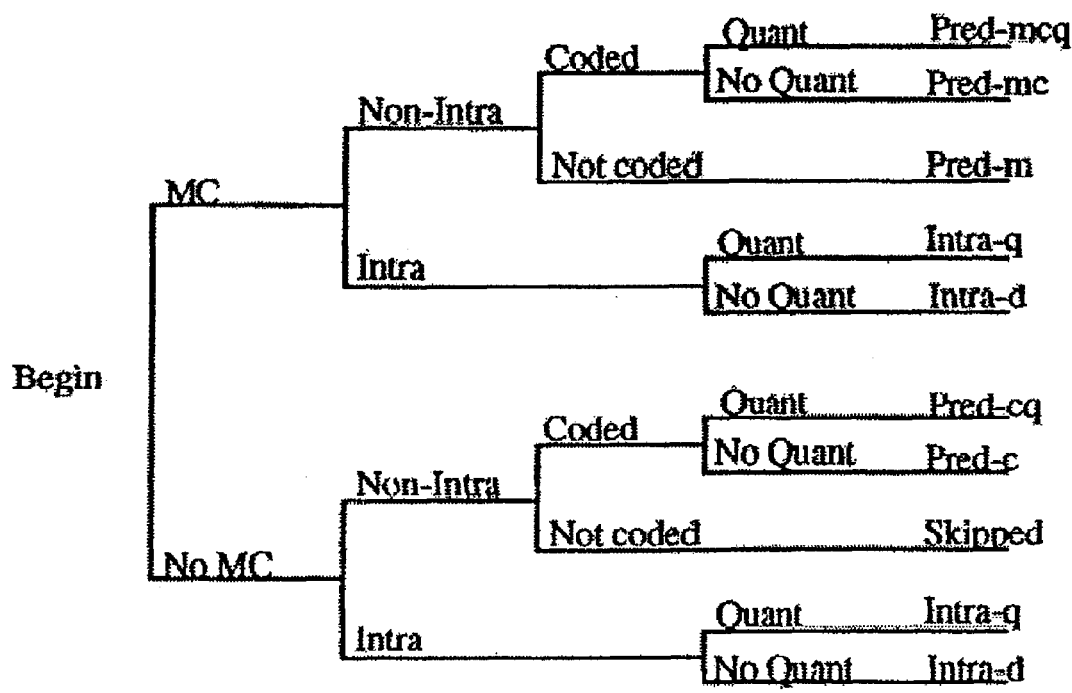
FIG. 7 illustrates a general example decision tree of macroblock coding models.

Step 2:

The JND profile representing the error visibility threshold in the spatial-temporal domain is expressed as, $JND_{S-T}(x,y,n)=f_3(ild(x,y,n)) \cdot JND_S(x,y,n)$ Where ild(x, y, n) denotes the average inter-frame luminance difference between the $n^{th}$ and $(n-1)^{th}$ frame. Thus, to calculate the spatial-temporal JND profile for each frame in a video sequence, the spatial JND profile of the frame and its previous reference frame are required. The function $f_3()$ represents the error visibility threshold due to motion. The empirical results of measuring $f_3()$ for all possible inter-frame luminance differences are shown in FIG. 1.

The JND is then applied to scale the matrices W and D such that the modification of these signals are undetectible to the viewer when compared to the original signal.

The analysis, calculation and the application of the JND profile can be performed in spatial domain, spatial-temporal domain or transform domain. The calculation of allowable signal modification can be done at the level of pixel, block, macroblock, region, field or frame.

Most still image and video compression techniques including JPEG, MPEG-1, MPEG-2, and MPEG-4 convert color frames into luminance-chrominance space (YCrCb or YUV) and the chrominance signals are filtered and resampled to reduce spatial bandwidth (4:2:0,4:2:2). That is, since the human eye is more sensitive to the luminance signal component Y than the color difference components Cr or Cb, or U or V, the luminance component is sampled at twice the rate as the chrominance signal components. The filtering and resampling are also used for changing the picture size to fit it into an output frame or to convert it into different video digital or analog formats. In some cases filters are used for picture quality improvement, adding special effects and noise reduction.

Another embodiment of the present invention changes the values of image pixels within some relatively small area (block) in a manner in which the average energy in the block is preserved. This technique can be applied for the entire image or for just portions of it (different regions or different color planes). When pixel energies are redistributed within color plane blocks, the resulting image is perceptually very similar to the original, although the actual pixel values in each color plane can be changed significantly.

The simplest example of this technique is changing values of two neighboring pixels $(x_1, x_2)$ to $(X'_1, X'_2)$ as follows:

$$\text{If } x_1 \approx x_2 \text{ and } (x_1 < \text{Max}/\sqrt{2}), \text{ then:} \quad (1)$$

$$X'_1 = x_1 \cdot \sqrt{2};$$

$$X'_2 = 0;$$

otherwise:

$$E = x_1^2 + x_2^2$$

$$X'_1 = \sqrt{E} \cdot K, \text{ where } k \approx 1;$$

$$\text{If}(X'_1 > \text{MAX}), X'_1 = \text{MAX};$$

$$X'_2 = \sqrt{E - X'_1 \cdot X'_2};$$

where MAX is the maximum possible pixel value in the image format (e.g. 255 for an 8-bit pixel).

In the general case, energy redistribution could be done within any area including overlapped regions with different number of pixels and shape.

The proposed technique can be also applied in the frequency domain by decreasing the energy of some frequency spectral coefficients and increasing energy of other frequency components.

This technique causes image and video encoding problems due to the following effects:
a) Subsampling of the chrominance data introduces aliasing distortion;
b) Filtering produces frames and images with reduced brightness; If in the example above a simple lowpass filter $X_i=(0.5*x_i+0.5*x_{i-1})$ is applied, the values $X'_1=x_1*$SQRT(2) and $X'_2=0$; are converted to $X_1'=$SQRT(2)/$2*x_1\approx 0.707*x_1$. This means that such filtered images or separate color planes become darker. If the proposed technique is applied only to certain color layers of an image or video, the filtering makes only processed color layers darker and causes noticeable color distortions. The reduction in brightness depends on the value of k in formula (1). Small values of k in the range (0.9 . . . 1.0) cause significant changes in brightness after filtering. It is possible to create the sequence of visually identical frames using slightly different values of k, which result in substantially different frames after filtering.
c) Additional bits are expended on additional high frequency components that need to be encoded.
d) The effectiveness of motion compensation predictive coding is reduced;
e) This technique changes the level of just noticeable distortion (JND) of the image and causes image modifications (noise addition, level adjustment) that are not visible in processed image, to become noticeable after filtering, scaling or compression.
f) Interlaced video can be processed with different settings applied to different fields.

Another embodiment of the present invention targets the video codec rate control mechanism and attempts to cause frequent buffer overflow or underflow. This can be accomplished by increasing the minimum variance of blocks in the encoding macroblock, under the limitation of the JND profile of the macroblock, and increasing P and B frame bit allocation by using the previous techniques described above. This technique is designed to control the encoding model decision resulting in the selection of a higher bit rate model by making a motionless region appear to be in motion to the encoder. An example algorithm for this process is as follows:
a. Segment the video into high motion and low motion regions or macroblocks. This can be done using any of a number of methods: one algorithm is to base the segmentation on temporal prediction error—a simple example being taking the difference between successive frames in the spatial domain, and applying a threshold to discriminate between low-motion and high-motion areas within each frame.
b. In frame k, within the low motion region, modify some or all of the macroblocks with pre-designed noise patterns under the limitation of the JND profile of frame k. An example of a pre-designed noise pattern is the high-frequency signal previously described, scaled by a perceptual weighting function.
c. In frame k+1, copy the modified macroblocks with displacements from frame k by some rule. For example, in even macroblock rows: copy the modified portions which fall below the JND profile of macroblock(i) to macroblock(i+1); in odd rows: copy the modified portions which fall below the JND profile of macroblock(i+1) to macroblock(i).
d. Evaluate the distortion of copied macroblocks. If the distortion is over the JND profile limitation, keep the same pattern but reduce the distortion proportionately to the JND and re-apply the technique to the original data.
e. In frames k and k+1, within the high motion region, modify macroblock luminance and chrominance data (subject to the constraint of limiting the modification to fall below the JND) such that macroblocks with substantially different chrominance data are matched in a typical motion estimation algorithm employed by a target compression/decompression algorithm.

Although the present invention has been described with respect to several exemplary embodiments, it will be understood that the invention is entitled to protection within the scope of the appended claims.

It is claimed:

1. A method of processing a visual image signal in a manner that discourages application of the signal to a target compression/decompression algorithm wherein the signal is compressed in an intermediate domain different than an original domain of the signal, comprising:
    transforming the signal from the original domain into the intermediate domain,
    thereafter modifying the signal when in the intermediate domain in a manner that the visibility of the modification is minimal when an inverse transform is applied to the modified signal but where the modification is highly visible when the inverse transform of the modified signal is subsequently processed by the target compression/decompression algorithm, and thereafter inverse transforming the modified signal from the intermediate domain back into the original domain, whereby processing of the inverse transformed modified signal by the target compression/decompression algorithm would cause the visual quality of the resulting signal to be significantly degraded.

2. The method of claim 1, additionally comprising processing the inverse transformed modified signal by the target compression/decompression algorithm, wherein the perception of the resulting signal is significantly degraded.

3. The method of claim 1, wherein the original and intermediate domains include different color spaces.

4. The method of claim 3, wherein the original domain includes an RGB color space and the intermediate domain includes a luminance-chrominance color space.

5. The method of claim 4, wherein modifying the signal includes sampling a luminance (Y) component at a different rate that a color (Cb or Cr or U or V) component.

6. The method of claim 1, wherein the original domain is spatial/temporal and the second domain is frequency.

7. The method of claim 1, wherein the target compression/decompression algorithm includes either MPEG or JPEG.

8. The method of claim 1, wherein the method is carried out by electronic circuits contained in a video appliance including either a DVD player or a television cable or satellite receiver that processes the visual signal for display.

9. A method of processing a visual image signal that is in a discrete color signal space, comprising:

transforming the visual image signal from the discrete color space into a luminance-chrominance space, thereafter modifying the visual image signal when in the luminance-chrominance space in a manner that the perceptibility of the modification is minimal when an inverse transform of the modified signal is reproduced but where the modification is highly perceptible when the inverse transform of the modified signal is subsequently processed by a compression and decompression algorithm, and thereafter inverse transforming the modified signal from the luminance-chrominance space back into the discrete color space, wherein the modification to the visual image signal is minimally perceptible from the modified signal but highly perceptible after the modified signal is processed by the compression and decompression algorithm.

10. The method of claim 9, additionally comprising processing the modified signal by the compression and decompression algorithm.

11. The method of claim 9, wherein modifying the visual image signal includes adding a signal to the visual image signal when in the luminance-chrominance space that increases the perceptibility of distortion that would result from quantization of coefficients within the compression and decompression algorithm.

12. The method of claim 9, wherein modifying the visual image signal includes adding a signal to the visual image signal when in the luminance-chrominance space that increases a number of components that the compression and decompression algorithm would be required to code.

13. The method of claim 9, wherein modifying the visual image signal includes adding a signal to the visual image signal when in the luminance-chrominance space that would reduce the efficiency of entropy encoding of quantized coefficients within the compression and decompression algorithm.

14. The method of claim 9, wherein modifying the visual image signal includes adding a signal to the visual image signal when in the luminance-chrominance space that would reduce the effectiveness of motion compensation within the compression and decompression algorithm.

15. The method of claim 9, wherein modifying the visual image signal includes adding a signal to the visual image signal when in the luminance-chrominance space that would reduce the effectiveness of predictive coding within the compression and decompression algorithm.

16. The method of claim 9, wherein modifying the visual image signal includes adding a signal to the visual image signal when in the luminance-chrominance space that would increase aliasing distortion due to sub-sampling of the modified signal within the compression and decompression algorithm.

17. The method of claim 9, wherein modifying the visual image signal includes adding a signal to the visual image signal when in the luminance-chrominance space that would reduce the effectiveness of a rate control process within the compression and decompression algorithm.

18. The method of claim 9, wherein modifying the visual image signal is controlled by maximizing the encoded bitrate for a given amount of added distortion.

19. The method of claim 9, wherein modifying the visual image signal is controlled by a perception distortion measurement.

20. The method of any one of claims 9-19, wherein the visual image signal being processed includes at least one still image signal.

21. The method of any one of claims 9-19, wherein the visual image signal being processed includes a signal of successive video image frames.

22. A method of processing a visual image signal including a plurality of discrete color signals, comprising:

modifying the plurality of discrete color signals in a manner that the visibility of the modification is minimal when the modified discrete color signals combined as the visual image signal and displayed but where the modification is highly visible when the modified signal is subsequently processed by a compression and decompression algorithm and the decompressed signal displayed, wherein the modification to the visual image signal is minimally perceptible from the modified signal but highly perceptible after the modified signal is processed by the compression and decompression algorithm.

* * * * *